(12) United States Patent
Hooker et al.

(10) Patent No.: US 8,364,906 B2
(45) Date of Patent: Jan. 29, 2013

(54) AVOIDING MEMORY ACCESS LATENCY BY RETURNING HIT-MODIFIED WHEN HOLDING NON-MODIFIED DATA

(75) Inventors: Rodney E. Hooker, Austin, TX (US); Colin Eddy, Austin, TX (US); Darius D. Gaskins, Austin, TX (US); Albert J. Loper, Jr., Austin, TX (US)

(73) Assignee: VIA Technologies, Inc., New Taipei City (TW)

( * ) Notice: Subject to any disclaimer, the term of this patent is extended or adjusted under 35 U.S.C. 154(b) by 318 days.

(21) Appl. No.: 12/880,958

(22) Filed: Sep. 13, 2010

(65) Prior Publication Data
US 2011/0113196 A1 May 12, 2011

Related U.S. Application Data

(60) Provisional application No. 61/259,344, filed on Nov. 9, 2009.

(51) Int. Cl.
*G06F 12/00* (2006.01)
(52) U.S. Cl. .......................................... 711/141
(58) Field of Classification Search .............. None
See application file for complete search history.

(56) References Cited

U.S. PATENT DOCUMENTS

| | | | |
|---|---|---|---|
| 6,298,420 B1 * | 10/2001 | Chittor et al. | 711/147 |
| 6,598,120 B1 * | 7/2003 | Berg et al. | 711/121 |
| 6,993,632 B2 | 1/2006 | Kruckemyer et al. | |
| 7,124,229 B2 | 10/2006 | Gilbert et al. | |
| 2004/0255085 A1 * | 12/2004 | Dieffenderfer et al. | 711/146 |

* cited by examiner

*Primary Examiner* — Hiep Nguyen
(74) *Attorney, Agent, or Firm* — E. Alan David; James W. Huffman

(57) ABSTRACT

A microprocessor is configured to communicate with other agents on a system bus and includes a cache memory and a bus interface unit coupled to the cache memory and to the system bus. The bus interface unit receives from another agent coupled to the system bus a transaction to read data from a memory address, determines whether the cache memory is holding the data at the memory address in an exclusive state (or a shared state in certain configurations), and asserts a hit-modified signal on the system bus and provides the data on the system bus to the other agent when the cache memory is holding the data at the memory address in an exclusive state. Thus, the delay of an access to the system memory by the other agent is avoided.

22 Claims, 3 Drawing Sheets

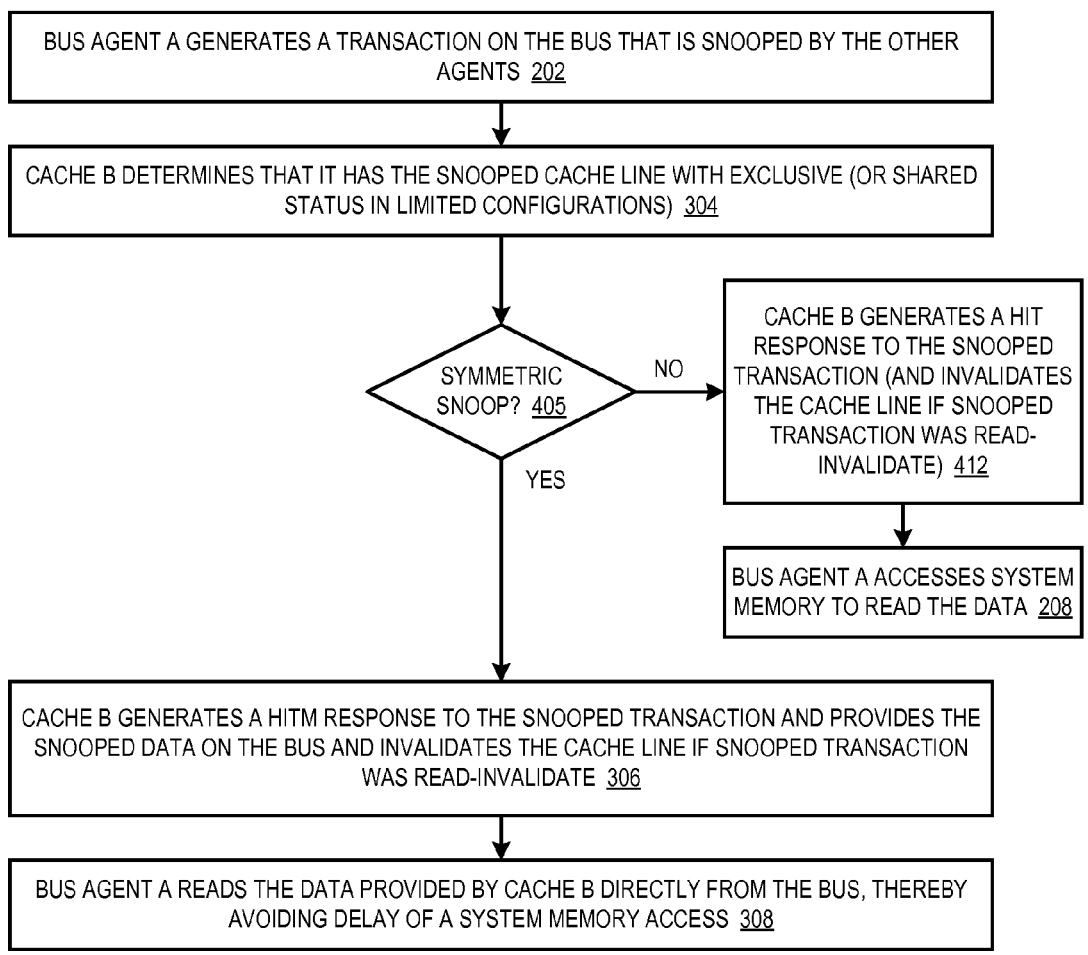
FIG. 4 (ALTERNATE EMBODIMENT)

AVOIDING MEMORY ACCESS LATENCY BY RETURNING HIT-MODIFIED WHEN HOLDING NON-MODIFIED DATA

CROSS REFERENCE TO RELATED APPLICATION(S)

This application claims priority based on U.S. Provisional Application Ser. No. 61/259,344, filed Nov. 9, 2009, entitled CACHE MEMORY THAT AVOIDS MEMORY ACCESS LATENCY BY RETURNING HIT-MODIFIED WHEN HOLDING NON-MODIFIED DATA, which is hereby incorporated by reference in its entirety.

FIELD OF THE INVENTION

The present invention relates in general to the field of cache memories, and particularly to maintaining coherency among multiple cache memories in a system.

BACKGROUND OF THE INVENTION

The time required by a processor in a computer system to access system memory has been increasing relative to the time required by the processor to access its own cache memories. Thus, what is needed is a way to reduce the effects of this disparity on system performance.

BRIEF SUMMARY OF INVENTION

In one aspect the present invention provides a microprocessor configured to communicate with other agents on a system bus. The microprocessor includes a cache memory and a bus interface unit, coupled to the cache memory and to the system bus. The bus interface unit is configured to receive from another agent coupled to the system bus a transaction to read data from a memory address. The bus interface unit is also configured to determine whether the cache memory is holding the data at the memory address in an exclusive state. The bus interface unit is also configured to assert a hit-modified signal on the system bus and provide the data on the system bus to the other agent when the cache memory is holding the data at the memory address in an exclusive state.

In another aspect, the present invention provides a system. The system includes a system bus and a plurality of agents, coupled to the system bus. At least one of the plurality of agents is a microprocessor. The microprocessor includes a cache memory and a bus interface unit, coupled to the cache memory and to the system bus. The bus interface unit is configured to receive from one of the other of the plurality of agents coupled to the system bus a transaction to read data from a memory address. The bus interface unit is also configured to determine whether the cache memory is holding the data at the memory address in an exclusive state. The bus interface unit is also configured to assert a hit-modified signal on the system bus and provide the data on the system bus to the other agent when the cache memory is holding the data at the memory address in an exclusive state.

In yet another aspect, the present invention provides a method for avoiding the delay of an access to a system memory in a system including a microprocessor having a cache memory and configured to communicate with other agents on a system bus. The method includes the microprocessor receiving from one of the other agents on the system bus a transaction to read data from a memory address. The method also includes the microprocessor determining whether the cache memory is holding the data at the memory address in an exclusive state. The method also includes the microprocessor asserting a hit-modified signal on the system bus and providing the data on the system bus to the other agent, when the cache memory is holding the data at the memory address in an exclusive state.

In yet another aspect, the present invention provides a computer program product encoded in at least one computer readable storage medium for use with a computing device, the computer program product comprising computer readable program code embodied in said medium, for specifying a microprocessor configured to communicate with other agents on a system bus. The computer readable program code includes first program code for specifying a cache memory. The computer readable program code also includes second program code for specifying a bus interface unit coupled to the cache memory and to the system bus. The bus interface unit is configured to receive from another agent coupled to the system bus a transaction to read data from a memory address. The bus interface unit is also configured to determine whether the cache memory is holding the data at the memory address in an exclusive state. The bus interface unit is also configured to assert a hit-modified signal on the system bus and provide the data on the system bus to the other agent when the cache memory is holding the data at the memory address in an exclusive state.

BRIEF DESCRIPTION OF THE DRAWINGS

FIGS. 3 and 4 are flowcharts illustrating two alternate modes of operation of the system of FIG. 1 according to the present invention that potentially reduces the amount of time required to obtain exclusively-owned data (and in one embodiment shared data) relative to the conventional mode of operation.

DETAILED DESCRIPTION OF THE INVENTION

Figure 1:
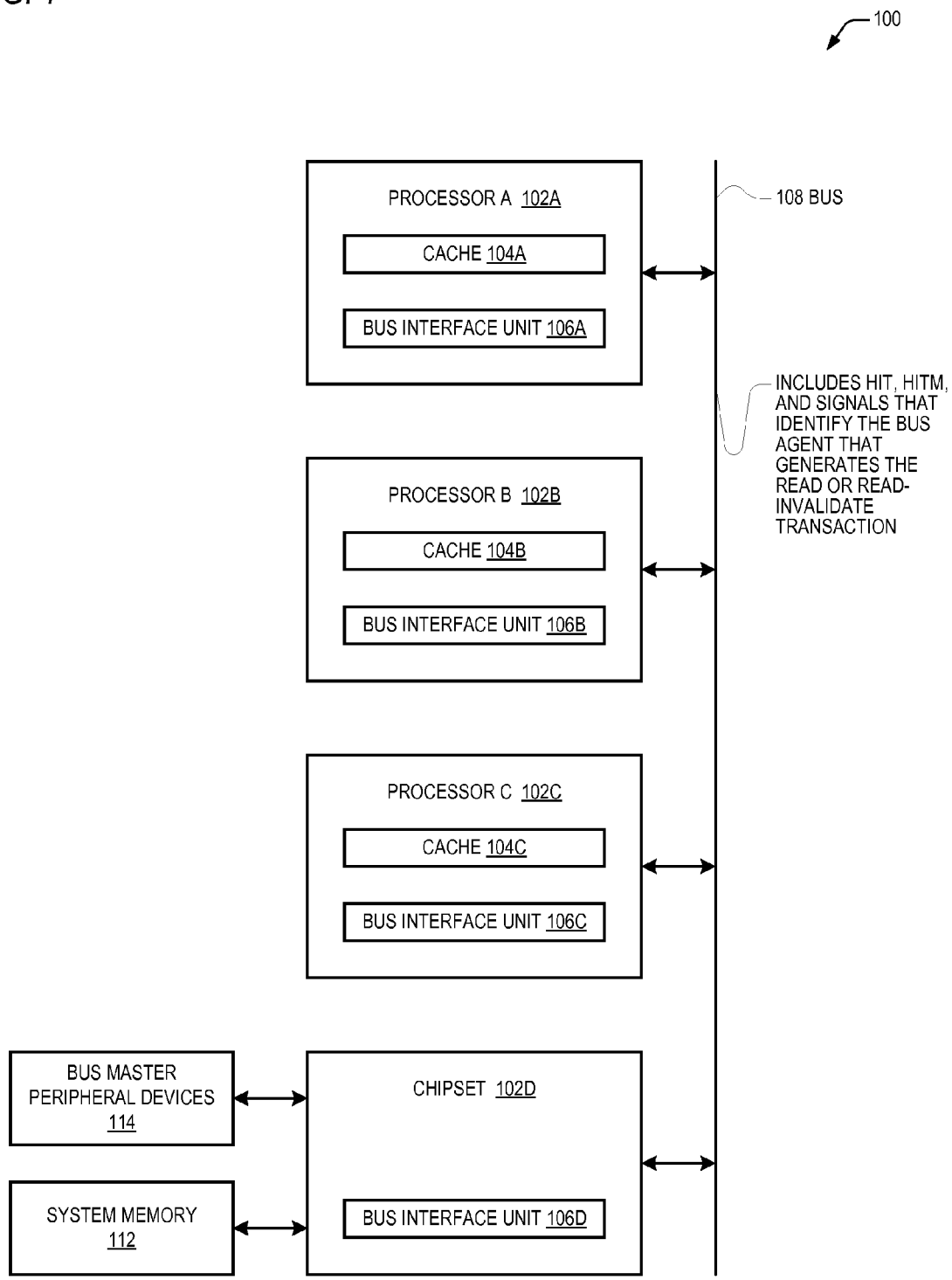
FIG. 1 is a block diagram illustrating a computing system having a system bus with multiple bus masters, or bus agents, coupled to it according to the present invention.

FIG. 1 is a block diagram illustrating a computing system 100 having a system bus 108 with multiple bus masters 102A-D, or bus agents 102A-D, coupled to it according to the present invention is shown. The bus agents 102 include one or more processors 102A-C (there are three processors in the example of FIG. 1) and a chipset 102D. Each of the bus agents 102 has a bus interface unit 106 for interfacing the processors 102A-C to the bus 108. More specifically, the bus interface units 106 generate and respond to transactions on the bus 108. The processors 102A-C share a system memory 112 that is coupled to the chipset 102D via a memory bus. Bus mastering peripheral devices 114 are also coupled to the chipset via a peripheral bus. The peripheral devices 114 may directly access the system memory 112, and the chipset 102D reflects these accesses on the system bus 108.

Each of the processors 102 has a cache memory 104 for caching data from the system memory 112. The agents 102 of the system 100 employ a snooping protocol to maintain cache coherence. The bus 108 includes signals that identify the bus agent 102 that originates a transaction on the bus 108. The bus 108 also includes a HIT signal that a processor 102A-C asserts in response to a read or read-invalidate transaction on the bus 108 if the processor 102A-C holds in its cache 104 the specified cache line in a shared or exclusive state. The bus 108 also includes a HITM signal that a processor 102A-C asserts in response to a read or read-invalidate transaction on the bus 108 if the processor 102A-C holds in its cache 104 the specified cache line in a modified state.

Figure 2:
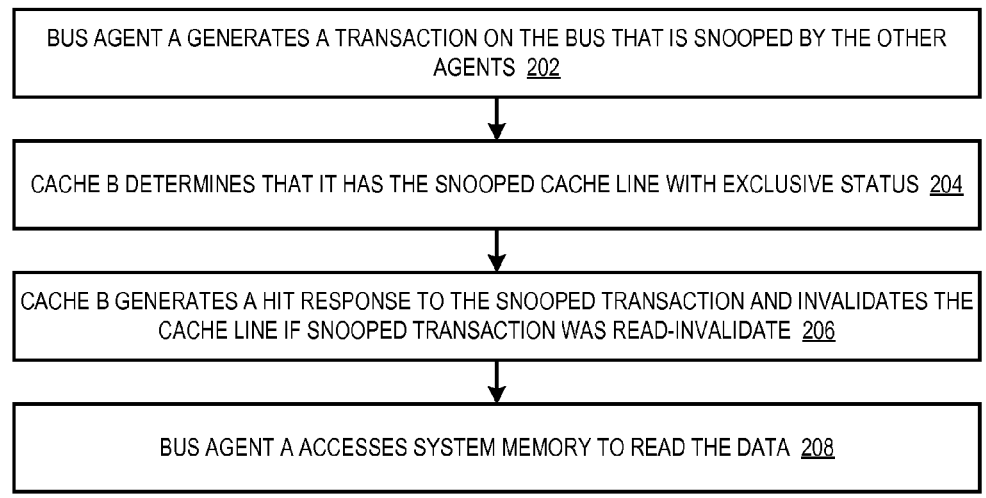
FIG. 2 is a flowchart illustrating a conventional mode of operation of the system of FIG. 1.

Referring now to FIG. 2, a flowchart illustrating a conventional mode of operation of the system 100 of FIG. 1 is shown. Flow begins at block 202.

At block 202, one of the bus agents 102 (referred to as agent A in the example of FIG. 2) generates a read or read-invalidate transaction on the bus 108. The other processors 102A-C snoop the transaction. Flow proceeds to block 204.

At block 204, one of the caches 104 that snooped the transaction (referred to as cache B in the example of FIG. 2) determines that it has the snooped cache line with Exclusive or Shared status. Flow proceeds to block 206.

At block 206, cache B asserts the HIT signal (actually the bus interface unit 106 of the processor 102 that includes cache B) on the bus 108 to indicate that it has the snooped cache line implicated by the transaction. Additionally, if the transaction was a read-invalidate transaction, cache B invalidates the cache line. Flow proceeds to block 208.

At block 208, agent A accesses system memory 112 to read the data specified by the transaction. Flow ends at block 208.

As may be observed from the description above, the conventional mode requires bus agent A to make an access to system memory 112 to read the data, which is disadvantageous because accesses to system memory 112 require a relatively long time to complete and may consume bandwidth to the system memory 112 that could otherwise be gainfully used by other agents 102 of the system 100.

Figure 3:
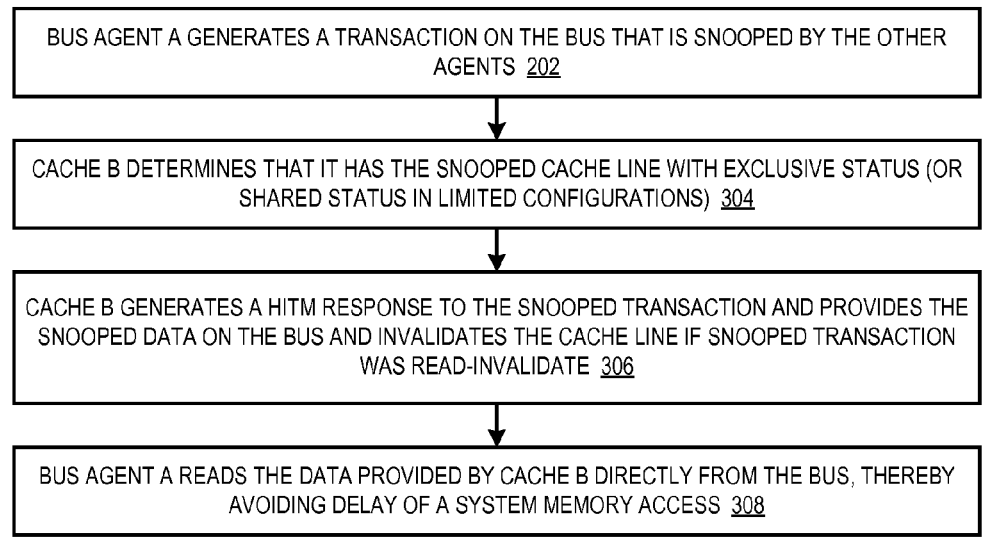

Referring now to FIG. 3, a flowchart illustrating a mode of operation of the system 100 of FIG. 1 according to the present invention that potentially reduces the amount of time required to obtain exclusively-owned data (and in one embodiment shared data) relative to the conventional mode of operation is shown. Flow begins at block 202, which is similar to block 202 of FIG. 2. Flow proceeds to block 304.

At block 304, cache B determines that it has the snooped cache line with Exclusive status. In one embodiment, if the system 100 is configured such that there is no possibility of multiple processors 102 asserting the HITM signal at block 306 (e.g., there are only two processors 102 and agent A will never assert HITM on its cycle, or the memory access latency avoidance feature is only enabled on one of the two processors 102), then cache B can also determine that it has the snooped cache line with Shared status. Flow proceeds to block 306.

At block 306, cache B asserts the HITM signal on the bus 108 to indicate that it has the snooped cache line implicated by the transaction in a Modified state. Essentially, cache B "lies" about the cache line being in a Modified state. Additionally, cache B provides the snooped cache line on the bus 108 to agent A. In one embodiment, the memory controller in the chipset 102D observes that the write of the snooped cache line by cache B and responsively writes the cache line to the system memory 112. Finally, if the transaction was a read-invalidate transaction, cache B invalidates the cache line. Flow proceeds to block 308.

At block 308, agent A reads the cache line provided by cache B directly from the bus 108, thereby avoiding the delay of an access to the system memory 112 to read the data specified by the transaction. Flow ends at block 308.

As may be observed from the description of FIG. 3 (and FIG. 4 below), advantageously the novel mode of operation potentially alleviates the need for agent A to access system memory because it receives the cache line directly from cache B. This is advantageous because it potentially provides the cache line to the requesting agent faster than if the cache line was obtained from system memory 112.

Referring now to FIG. 4, a flowchart illustrating a mode of operation of the system 100 of FIG. 1 according to an alternate embodiment of the present invention that potentially reduces the amount of time required to obtain exclusively-owned data (and in one embodiment shared data, i.e., in a configuration such that there is no possibility of multiple processors 102 asserting the HITM signal, e.g., there are only two processors 102 and agent A will never assert HITM on its cycle, or the memory access latency avoidance feature is only enabled on one of the two processors 102) relative to the conventional mode of operation is shown. Flow begins at block 202, which is similar to block 202 of FIG. 2. Flow proceeds to block 304, which is similar to block 304 of FIG. 3. Flow proceeds to decision block 405.

At decision block 405, cache B determines whether it is snooping a symmetric agent, i.e., another processor 102, rather than the priority agent, i.e., chipset 102D. Cache B is able to determine the agent 102 that generated the transaction from the bus 108 signals that identify the generating agent. If cache B is snooping the transaction of another processor 102, flow proceeds to block 306; otherwise, flow proceeds to block 412.

Blocks 306 and 308 of FIG. 4 are similar to blocks 306 and 308 of FIG. 3. Flow ends at block 308.

At block 412, cache B asserts the HIT signal on the bus 108 to indicate that it has the snooped cache line implicated by the transaction. Additionally, if the transaction was a read-invalidate transaction, cache B invalidates the cache line. Flow proceeds to block 208.

Block 208 of FIG. 4 is similar to block 208 of FIG. 2. Flow ends at block 208.

A possible benefit of the alternate embodiment of FIG. 4 is that although it causes a memory access by the chipset 102D, it potentially makes more efficient use of the bus 108 since the read transaction with a HIT response may complete faster than with a HITM response since in some configurations the chipset 102D may read the data from the memory 112 and write it to the bus master peripheral device 114 without transferring it on the bus 108.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor configured to communicate with other agents on a system bus, the microprocessor comprising:
   a cache memory; and
   a bus interface unit, coupled to the cache memory and to the system bus, configured to:
      receive from another agent coupled to the system bus a transaction to read data from a memory address;
      determine whether the cache memory is holding the data at the memory address in an exclusive state;
      determine whether the other agent is a priority agent;
      when the cache memory is holding the data at the memory address in an exclusive state and the other agent is not a priority agent, assert a hit-modified signal on the system bus and provide the data on the system bus to the other agent; and
      when the cache memory is holding the data at the memory address in an exclusive state and the other agent is a priority agent, assert a hit signal on the system bus and refrain from providing the data on the system bus to the other agent.

2. The microprocessor of claim 1, wherein the microprocessor knows it is the only agent coupled to the system bus capable of asserting the hitmodified signal during the transaction when holding data in a shared state, wherein the bus interface unit is further configured to:
   determine whether the cache memory is holding data at the memory address in a shared state; and
   when the cache memory is holding data at the memory address in a shared state, assert the hitmodified signal on the system bus and provide the data on the system bus to the other agent.

3. The microprocessor of claim 1, wherein the bus interface unit is further configured to:
   receive from another agent coupled to the system bus a transaction to read second data from a second memory address and to invalidate a cache line containing the second data;
   determine whether the cache memory is holding the second data at the second memory address in an exclusive state; and
   when the cache memory is holding the second data at the second memory address in an exclusive state, assert the hitmodified signal on the system bus and provide the second data on the system bus to the other agent and invalidate the cache line.

4. The microprocessor of claim 1, wherein the priority agent comprises a chipset having a system memory coupled thereto.

5. The microprocessor of claim 1, wherein the priority agent comprises a chipset having a bus mastering peripheral coupled thereto.

6. A system, comprising:
   a system bus; and
   a plurality of agents, coupled to the system bus, wherein at least one of the plurality of agents is a microprocessor comprising:
      a cache memory; and
      a bus interface unit, coupled to the cache memory and to the system bus, configured to:
         receive from one of the other of the plurality of agents coupled to the system bus a transaction to read data from a memory address;
         determine whether the cache memory is holding the data at the memory address in an exclusive state;
         determine whether the other agent is a priority agent;
         when the cache memory is holding the data at the memory address in an exclusive state pnd the other agent is not a priority agent, assert a hit-modified signal on the system bus and provide the data on the system bus to the other agent; and
         when the cache memory is holding the ate at the memory address in an exclusive state and the other agent is a priority agent, assert a hit signal on the system bus and refrain from providing: the data on the system bus to the other agent.

7. The system of claim 6, wherein the microprocessor knows it is the only agent coupled to the system bus capable of asserting the hitmodified signal during the transaction when holding data in a shared state, wherein the bus interface unit is further configured to:
   determine whether the cache memory is holding data at the memory address in a shared state; and
   when the cache memory is holding data at the memory address in a shared state, assert the hitmodified signal on the system bus and provide the data on the system bus to the other agent.

8. The system of claim 6, wherein the bus interface unit is further configured to:
   receive from the other agent coupled to the system bus a transaction to read second data from a second memory address and to invalidate a cache line containing the second data;
   determine whether the cache memory is holding the second data at the second memory address in an exclusive state; and
   when the cache memory is holding the second data at the second memory address in an exclusive state, assert the hitmodified signal on the system bus and provide the second data on the system bus to the other agent and invalidate the cache line.

9. The system of claim 6, wherein the priority agent comprises a chipset having a system memory coupled thereto.

10. The system of claim 6, wherein the priority agent comprises a chipset having a bus mastering peripheral coupled thereto.

11. The system of claim 6, wherein the plurality of agents comprises a plurality of microprocessors configured as said microprocessor.

12. A method for avoiding the delay of an access to a system memory in a system including a microprocessor having a cache memory and configured to communicate with other agents on a system bus, the method comprising:
   receiving, by the microprocessor from one of the other agents on the system bus, a transaction to read data from a memory address;
   determining, by the microprocessor, whether the cache memory is holding the data at the memory address in an exclusive state;
   determining whether the other agent is a priority agent;
   asserting a hit-modlied signal on the system bus and providing the data on the system bus to the other agent, when the cache memory is holding the data at the memory address in an exclusive state and the other agent is not a priority agent; and asserting a hit signal on the system bus and ofraining from providing the data on the system bus to the other agent, when the cache memory is holding the data at the memory address in an exclusive state and the other agent is a priority agent.

13. The method of claim 12, further comprising:
determining whether the cache memory is holding data at the memory address in a shared state when the microprocessor knows it is the only agent coupled to the system bus capable of asserting the hitmodified signal during the transaction when holding data in a shared state; and
asserting the hitmodified signal on the system bus and provide the data on the system bus to the other agent, when the cache memory is holding data at the memory address in a shared state.

14. The method of claim 12, further comprising:
receiving from another agent coupled to the system bus a transaction to read second data from a second memory address and to invalidate a cache line containing the second data;
determining whether the cache memory is holding the second data at the second memory address in an exclusive state; and
asserting the hitmodified signal on the system bus and providing the second data on the system bus to the other agent and invalidating the cache line, when the cache memory is holding the second data at the second memory address in an exclusive state.

15. The method of claim 12, wherein the priority agent comprises a chipset having a system memory coupled thereto.

16. The method of claim 12, wherein the priority agent comprises a chipset having a bus mastering peripheral coupled thereto.

17. A computer program product encoded in at least one non-transitory computer readable storage medium for use with a computing device, the computer program product comprising:
computer readable program code embodied in said medium, for specifying a microprocessor configured to communicate with other agents on a system bus, the computer readable program code comprising:
first program code for specifying a cache memory; and
second program code for specifying a bus interface unit, coupled to the cache memory and to the system bus;
wherein the bus interface unit is configured to:
receive from another agent coupled to the system bus a transaction to read data from a memory address;
determine whether the other cache memory is holding the data at the memory address in an exclusive state;
determine whether the other agent is a priority agent;
when the cache memory is holding the data at the memory address in an exclusive state and the other agent is not a priority agent assert a hit-modified signal on the system bus and provide on the system bus to the other agent; and
when the cache memory is holding the data at the memory address in an exclusive state and the other agent is a priority agent, assert a hit signal on the system bus and refrain from providing the data on the system bus to the other agent.

18. The computer program product of claim 17, wherein the at least one computer readable storage medium is selected from the set of a disk, tape, or other magnetic or optical medium.

19. A microprocessor configured to communicate with other agents on a system bus, the microprocessor comprising:
a cache memory; and
a bus interface unit, coupled to the cache memory and to the system bus, configured to:
receive from another agent coupled to the system bus a transaction to read data from a memory address;
determine whether the cache memory is holding the data at the memory address in an exclusive state; and
when the cache memory is holding the data at the memory address in an exclusive state, assert a hit-modified signal on the system bus and provide the data on the system bus to the other agent;
wherein the microprocessor knows it is the only agent coupled to the system bus capable of asserting the hit-modified signal during the transaction when holding data in a shared state, wherein the bus interface unit is further configured to:
determine whether the cache memory is holding data at the memory address in a shared state; and
when the cache memory is holding data at the memory address in a shared state, assert the hit-modified signal on the system bus and provide the data on the system bus to the other agent.

20. A system, comprising:
a system bus; and
a plurality of agents, coupled to the system bus, wherein at least one of the plurality of agents is a microprocessor comprising:
a cache memory; and
a bus interface unit, coupled to the cache memory and to the system bus, configured to:
receive from one of the other of the plurality of agents coupled to the system bus a transaction to read data from a memory address;
determine whether the cache memory is holding the data at the memory address in an exclusive state; and
when the cache memory is holding the data at the memory address in an exclusive state, assert a hit-modified signal on the system bus and provide the data on the system bus to the other agent;
wherein the microprocessor knows it is the only agent coupled to the system bus capable of asserting the hit-modified signal during the transaction when holding data in a shared state, wherein the bus interface unit is further configured to:
determine whether the cache memory is holding data at the memory address in a shared state; and
when the cache memory is holding data at the memory address in a shared state, assert the hitmodified signal on the system bus and provide the data on the system bus to the other agent.

21. A method for avoiding the delay of an access to a system memory in a system including a microprocessor having a cache memory and configured to communicate with other agents on a system bus, the method comprising:
receiving, by the microprocessor from one of the other agents on the system bus, a transaction to read data from a memory address;
determining, by the microprocessor, whether the cache memory is holding the data at the memory address in an exclusive state; and
asserting, by the microprocessor, a hitmodified signal on the system bus and providing the data on the system bus to the other agent, when the cache memory is holding the data at the memory address in an exclusive state;

determining whether the cache memory is holding data at the memory address in a shared state when the microprocessor knows it is the only agent coupled to the system bus capable of asserting the hitmodified signal during the transaction when holding data in a shared state; and asserting the hitmodified signal on the system bus and provide the data on the system bus to the other agent, when the cache memory is holding data at the memory address in a shared state.

22. A non-transitory computer program product encoded in at least one computer readable storage medium for use with a computing device, the computer program product comprising:

computer readable program code embodied in said medium, for specifying a microprocessor configured to communicate with other agents on a system bus, the computer readable program code comprising:

first program code for specifying a cache memory; and
  second program code for specifying a bus interface unit, coupled to the cache memory and to the system bus;
  wherein the bus interface unit is configured to:

receive from another agent coupled to the system bus a transaction to read data from a memory address;
   determine whether the cache memory is holding the data at the memory address in an exclusive state; and
   when the cache memory is holding the data at the memory address in an exclusive state, assert a hitmodified signal on the system bus and provide the data on the system bus to the other agent;

wherein the microprocessor knows it is the only agent coupled to the system bus capable of asserting the hitmodified signal during the transaction when holding data in a shared state, wherein the bus interface unit is further configured to:

determine whether the cache memory is holding data at the memory address in a shared state; and
   when the cache memory is holding data at the memory address in a shared state, assert the hitmodified signal on the system bus and provide the data on the system bus to the other agent.

\* \* \* \* \*